(12) United States Patent
Kim et al.

(10) Patent No.: US 10,182,468 B2
(45) Date of Patent: Jan. 15, 2019

(54) METHOD FOR PERFORMING D2D COMMUNICATION IN WIRELESS COMMUNICATION SYSTEM AND DEVICE THEREFOR

(71) Applicant: LG ELECTRONICS INC., Seoul (KR)

(72) Inventors: Taehun Kim, Seoul (KR); Youngdae Lee, Seoul (KR); Jaehyun Kim, Seoul (KR); Sunghoon Jung, Seoul (KR); Jinsook Ryu, Seoul (KR); Hyunsook Kim, Seoul (KR); Laeyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/322,716

(22) PCT Filed: Jul. 1, 2015

(86) PCT No.: PCT/KR2015/006778
§ 371 (c)(1),
(2) Date: Dec. 28, 2016

(87) PCT Pub. No.: WO2016/003199
PCT Pub. Date: Jan. 7, 2016

(65) Prior Publication Data
US 2017/0156175 A1 Jun. 1, 2017

Related U.S. Application Data

(60) Provisional application No. 62/023,191, filed on Jul. 11, 2014, provisional application No. 62/019,851, filed on Jul. 1, 2014.

(51) Int. Cl.
*H04W 4/00* (2018.01)
*H04W 76/27* (2018.01)
(Continued)

(52) U.S. Cl.
CPC .......... *H04W 76/27* (2018.02); *H04W 72/04* (2013.01); *H04W 72/0406* (2013.01);
(Continued)

(58) Field of Classification Search
CPC .................................................. H04W 72/0406
See application file for complete search history.

(56) References Cited

U.S. PATENT DOCUMENTS 5,546,546 A * 8/1996 Bell ..................... G06F 13/362
710/100
9,769,644 B2 * 9/2017 He ........................ H04W 8/005
(Continued)

OTHER PUBLICATIONS

PCT International Application No. PCT/KR2015/006778, Written Opinion of the International Searching Authority dated Oct. 13, 2015, 21 pages.
(Continued)

*Primary Examiner* — Farah Faroul
(74) *Attorney, Agent, or Firm* — Lee, Hong, Degerman, Kang & Waimey

(57) ABSTRACT

One embodiment of the present invention relates to a method by which a terminal performs device-to-device (D2D) communication in a wireless communication system, the method comprising the steps of: converting into a radio resource control (RRC) connection state through the transmission of a service request; being allocated a resource for the D2D communication; transmitting a D2D signal through the allocated resource; and receiving a system information block (SIB) after transmitting the D2D signal, wherein if the SIB includes information on a resource pool, the terminal does not perform an RRC recovery-related operation even if RRC connection failure occurs.

18 Claims, 7 Drawing Sheets

(51) Int. Cl.
*H04W 76/10* (2018.01)
*H04W 72/04* (2009.01)
*H04W 76/18* (2018.01)
*H04W 76/14* (2018.01)
*H04W 76/38* (2018.01)

(52) U.S. Cl.
CPC ........... *H04W 76/10* (2018.02); *H04W 76/14* (2018.02); *H04W 76/18* (2018.02); *H04W 76/38* (2018.02)

(56) References Cited

U.S. PATENT DOCUMENTS

| | | | |
|---|---|---|---|
| 2010/0167746 A1* | 7/2010 | Lee | H04W 48/12 455/450 |
| 2012/0282956 A1* | 11/2012 | Kim | H04L 51/38 455/466 |
| 2013/0303152 A1* | 11/2013 | Kim | H04W 72/082 455/422.1 |
| 2014/0355417 A1* | 12/2014 | Kim | H04W 24/04 370/221 |
| 2015/0131454 A1* | 5/2015 | Wegmann | H04W 76/19 370/242 |
| 2015/0156692 A1* | 6/2015 | Kim | H04W 8/02 455/436 |
| 2015/0264677 A1* | 9/2015 | He | H04W 72/02 370/312 |
| 2015/0271861 A1* | 9/2015 | Li | H04W 56/001 455/426.1 |
| 2015/0319737 A1* | 11/2015 | Cheng | H04W 76/14 370/329 |
| 2015/0327312 A1* | 11/2015 | Burbidge | H04W 72/14 370/329 |
| 2016/0044727 A1* | 2/2016 | Zisimopoulos | H04W 48/02 455/41.2 |
| 2016/0095131 A1* | 3/2016 | Seo | H04W 72/085 370/329 |
| 2016/0142860 A1* | 5/2016 | Kim | H04W 60/00 455/435.1 |
| 2017/0230938 A1* | 8/2017 | Huang | H04W 76/10 |
| 2017/0311293 A1* | 10/2017 | Jung | H04W 76/38 |
| 2017/0311375 A1* | 10/2017 | Jung | H04W 76/10 |
| 2017/0353848 A1* | 12/2017 | He | H04L 5/0069 |
| 2018/0103367 A1* | 4/2018 | Kim | H04W 8/08 |

OTHER PUBLICATIONS

LG Electronics, "Exceptional cases to trigger autonomous transmission mode", R2-142629, 3GPP TSG RAN WG2 Meeting #86, May 2014, 3 pages.

LG Electronics, "Network configurations for mode 2 operation", R2-142636, 3GPP TSG RAN WG2 Meeting #86, May 2014, 4 pages.

Interdigital Communications, "Mode Selection for D2D Communications", R2-142685, 3GPP TSG RAN WG2 Meeting #86, May 2014, 5 pages.

3rd Generation Partnership Project (3GPP), "Technical Specification Group Radio Access Network; Study on LTE Device to Device Proximity Services; Radio Aspects (Release 12)," 3GPP TR 36.843 V12.0.1, Mar. 2014, 51 pages.

"3GPP TSG RAN; RRC; Protocol specification (Release 7)", 3GPP TS 25.331 V7.15.0, Dec. 2009, 1495 pages.

* cited by examiner

METHOD FOR PERFORMING D2D COMMUNICATION IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2015/006778, filed on Jul. 1, 2015, which claims the benefit of U.S. Provisional Application No. 62/019,851, filed on Jul. 1, 2014 and 62/023,191, filed on Jul. 11, 2014, the contents of which are all hereby incorporated by reference herein in their entirety.

TECHNICAL FIELD

The present invention relates to a wireless communication system, and more particularly, to a method and device for performing D2D communication.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

DISCLOSURE

Technical Problem

An object of the present invention is to provide an operation method when a resource allocation scheme is changed in D2D communication.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one embodiment of the present invention, a method by which a UE performs device-to-device (D2D) communication in a wireless communication system comprises the steps of switching to a radio resource control (RRC) connection state through the transmission of a service request; being allocated a resource for the D2D communication; transmitting a D2D signal through the allocated resource; and receiving a system information block (SIB) after transmitting the D2D signal, wherein if the SIB includes information on a resource pool, the UE does not perform an RRC recovery-related operation even if RRC connection failure occurs.

In another embodiment of the present invention, a UE for performing device-to-device (D2D) communication in a wireless communication system comprises a transceiver; and a processor, wherein the processor is configured to switch to a radio resource control (RRC) connection state through the transmission of a service request, be allocated a resource for the D2D communication, transmits a D2D signal through the allocated resource, and receives a system information block (SIB) after transmitting the D2D signal, and wherein if the SIB includes information on a resource pool, the UE does not perform an RRC recovery-related operation even if RRC connection failure occurs.

The RRC connection failure may occur when there are no pending user uplink data.

The RRC connection failure may occur within a predetermined time before TAU (tracking area update) grant or TAU rejection is received.

The SIB may be either SystemInformationBlockType18 or SystemInformationBlockType18.

The RRC recovery related operation may transmit a TAU request to an MME (mobility management entity).

The method may further comprise the step of transmitting D2D data by using a part of the resource pool if the UE has D2D data to be transmitted.

Information indicating the RRC connection failure may be transmitted from an RRC layer to a NAS (Non-Access-Stratum) layer.

A transmission mode may be 1 when the service request is transmitted, and a transmission mode indicated by the SIB may be mode 2.

A discovery type may be type 2 when the service request is transmitted, and a discovery type indicated by the SIB may be type 1.

The D2D signal may be either a discovery signal or a communication signal.

Advantageous Effects

According to the present invention, NAS signaling may be handled efficiently in accordance with a change of a resource allocation scheme, whereby unnecessary signaling or D2D service delay may be reduced.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
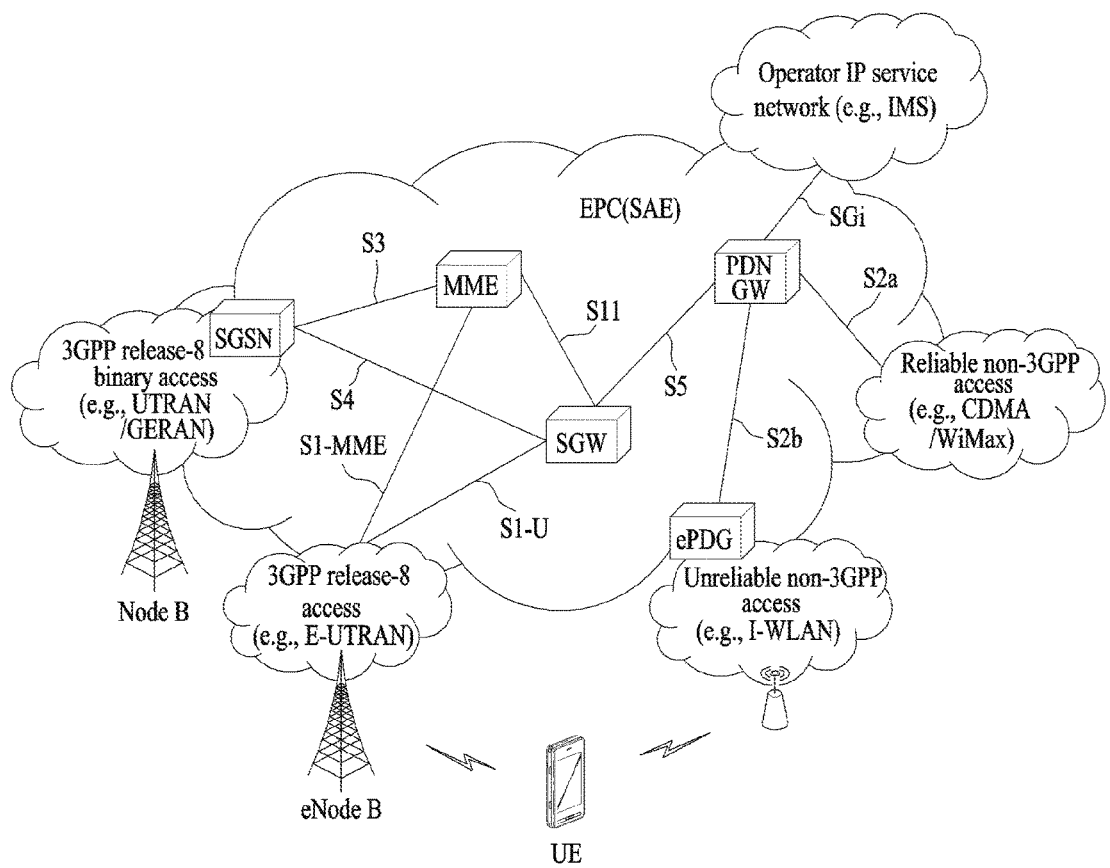
FIG. 1 is a diagram illustrating a brief structure of an EPS (evolved packet system) that includes an EPC (evolved packet core)

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

Specific terminologies hereinafter used in the embodiments of the present invention are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless communication systems. Although the following description will be made based on the 3GPP LTE and 3GPP LTE-A system for clarification, it is to be understood that the technical spirits of the present invention are not limited to the 3GPP LTE and 3GPP LTE-A system.

Terminologies used herein will be defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data are exchanged through a direct data path without through a 3GPP core network (for example, EPC).

ProSe Communication: communication between two or more ProSe-enabled UEs in proximity by means of a ProSe Communication path. Unless explicitly stated otherwise, the term "ProSe Communication" refers to any/all of the following: ProSe E-UTRA Communication, ProSe-assisted WLAN direct communication between two UEs, ProSe Group Communication and ProSe Broadcast Communication.

ProSe E-UTRA Communication: ProSe Communication using a ProSe E-UTRA Communication path.

ProSe-assisted WLAN direct communication: ProSe Communication using a ProSe-assisted WLAN direct communication path.

ProSe Communication path: communication path supporting ProSe Communication. The ProSe E-UTRA Communication path could be established between the ProSe-enabled UEs using E-UTRA, or routed via local eNB(s). The ProSe-assisted WLAN direct communication path may be established directly between the ProSe-enabled UEs using WLAN.

EPC Path (or infrastructure data path): the user plane communication path through EPC.

ProSe Discovery: a process that identifies that a UE that is ProSe-enabled is in proximity of another, using E-UTRA.

ProSe Group Communication: one-to-many ProSe Communication, between more than two ProSe-enabled UEs in proximity, by means of a common communication path established between the ProSe-enabled UEs.

ProSe UE-to-Network Relay: is a form of relay in which a ProSe-enabled Public Safety UE acts as a communication relay between a ProSe-enabled Public Safety UE and the ProSe-enabled network using E-UTRA.

ProSe UE-to-UE Relay: is a form of relay in which a ProSe-enabled Public Safety UE acts as a ProSe Communication relay between two or more ProSe-enabled Public Safety UEs.

ProSe-enabled Network: a network that supports ProSe Discovery, ProSe Communication and/or ProSe-assisted WLAN direct communication. Hereinafter, the ProSe-enabled Network may simply be referred to as a network.

ProSe-enabled UE: a UE that supports ProSe Discovery, ProSe Communication and/or ProSe-assisted WLAN direct communication. Hereinafter, the ProSe-enabled UE and the ProSe-enabled Public Safety UE may be referred to as UE.

Proximity: proximity is determined ("a UE is in proximity of another UE") when given proximity criteria are fulfilled. Proximity criteria can be different for discovery and communication.

ISR (Idle mode Signaling Reduction): When a UE frequently moves between E-UTRAN and UTRAN/GERAN, waste of network resources occurs due to a repeated position registration process. As a method for reducing such a waste, when the UE is in an idle mode, after position registration for MME and SGSN (hereinafter, these two nodes will be referred to as mobility management node) is performed through the E-UTRAN and the UTRAN/GERAN, a separate position registration is not performed in the case that movement between two RATs (Radio Access Technologies) which are already registered or cell reselection is performed. Therefore, if DL (downlink) data to the corresponding UE is arrived, paging is transmitted to the E-UTRAN and the UTRAN/GERAN at the same time to successfully discover the UE, whereby the DL data may be transferred to the discovered UE. [see 3GPP TS 23.401 and 3GPP TS 23.060]

Evolved Packet Core (EPC)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
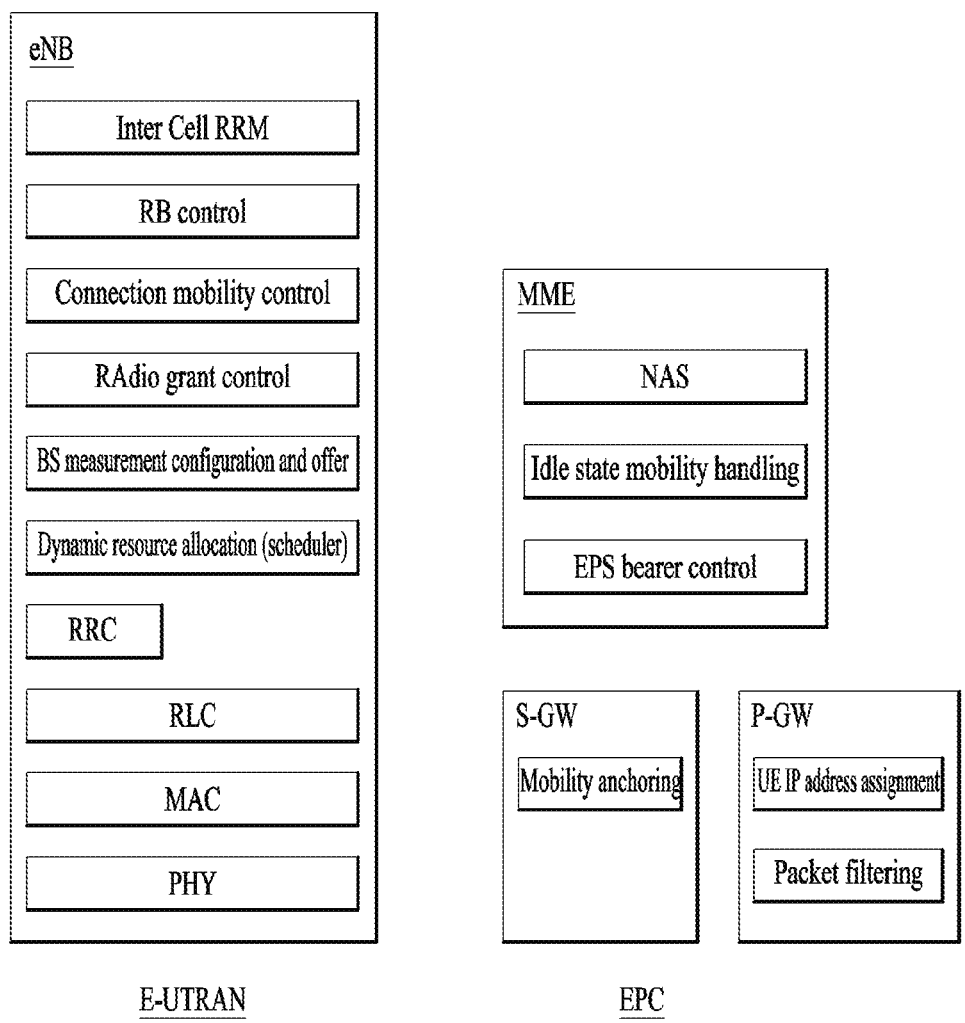
FIG. 2 is an exemplary diagram illustrating an architecture of a general E-UTRAN and a general EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
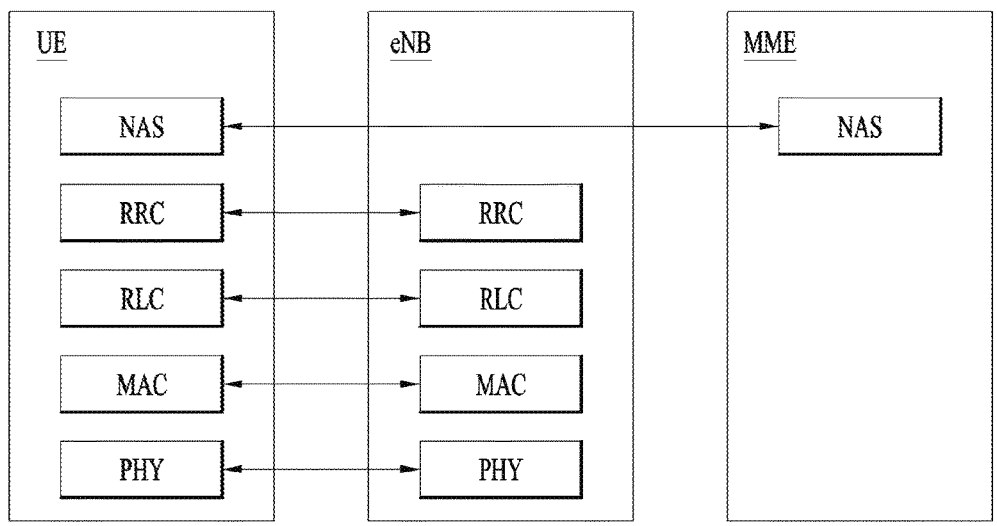
FIG. 3 is an exemplary diagram illustrating a structure of a radio interface protocol on a control plane.
Figure 4:
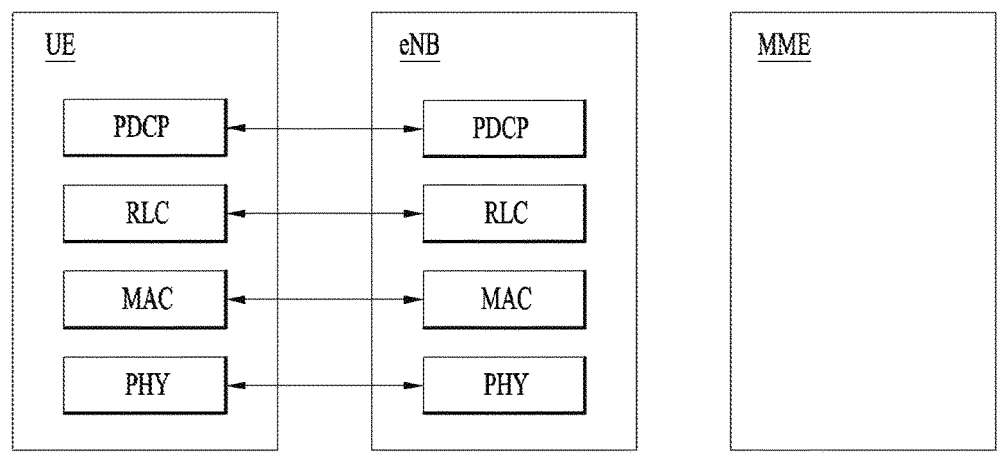
FIG. 4 is an exemplary diagram illustrating a structure of a radio interface protocol on a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC_connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC_connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
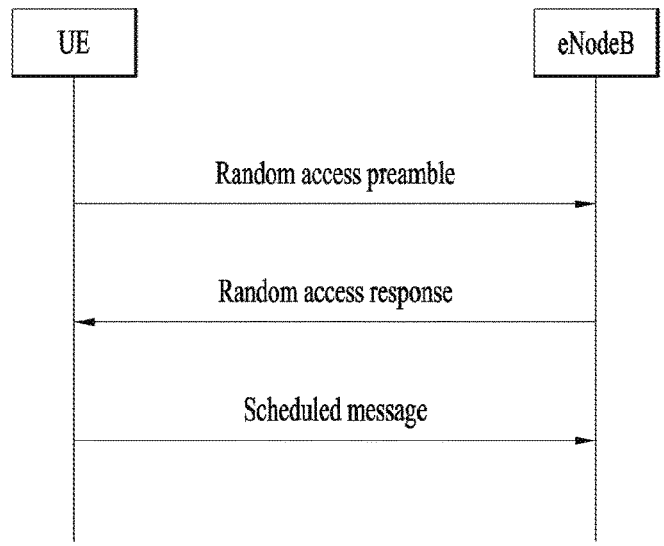
FIG. 5 is a flow chart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
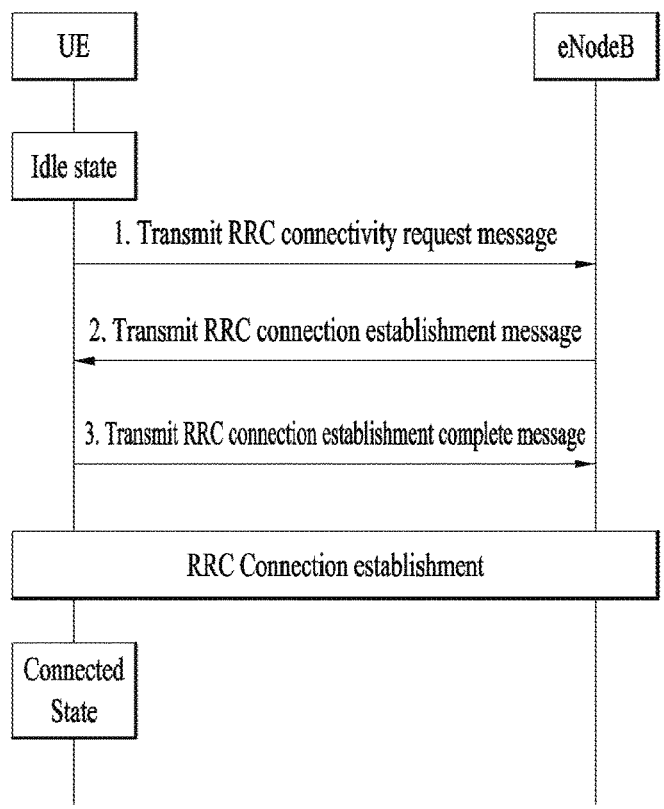
FIG. 6 is a diagram illustrating a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNodeB and transition to the RRC connected mode.

One-to-Many Prose Direct Communication

Figure 7:
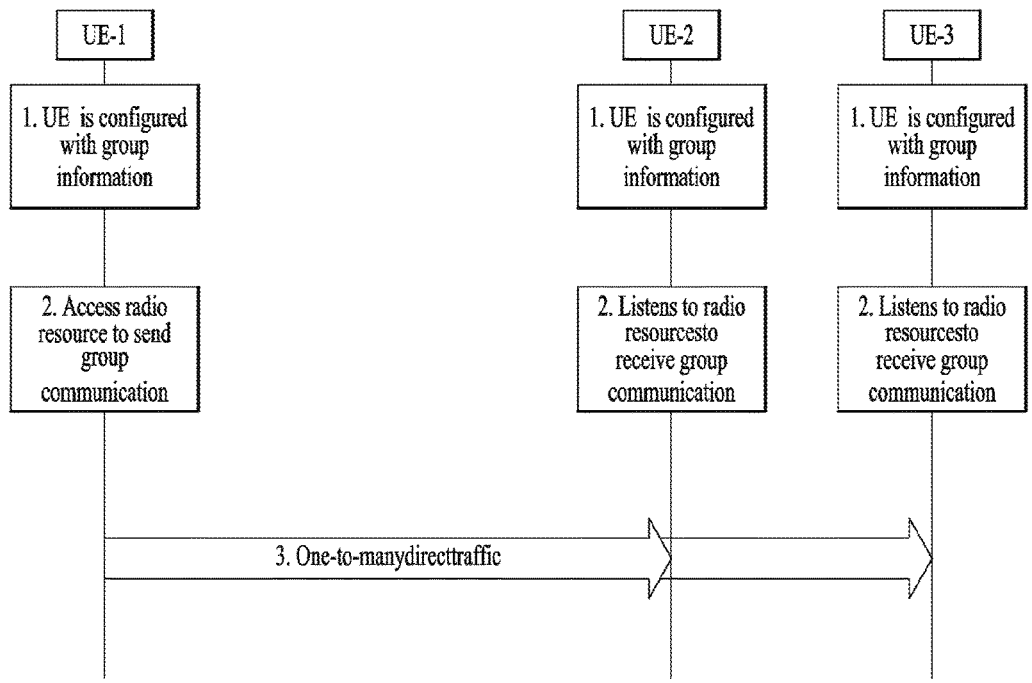
FIGS. 7 to 10 are diagrams illustrating the embodiment of the present invention.

One-to-many ProSe Direct communication transmission, which may be used for public safety, is illustrated in FIG. 7. A UE, which includes information for one-to-many Prose direct communication, may receive desired group context (Prose layer-2 Group ID, Prose Group IP multicast address, etc.) through a request of a ProSe function in a Service Authorization Procedure, or may pre-configure the desired group context. Radio resource parameters used for direct communication are acquired through an eNB. An originating UE UE1 discovers a proper radio resource to perform one-to-many Prose direct communication. If the UE is served by an E-UTRAN, the UE uses a radio resource signaled from a network. A PDU (protocol data unit) is related to a layer 3 protocol data unit type. A packet transmitted to an AS (Access Stratum) is associated with source layer 2 ID and destination layer 2 ID. In this case, the destination layer 2 ID is set to Prose layer 2 group ID. The originating UE transmits IP data to an IP multicast address by using Prose layer 2 group ID as the destination layer 2. Hereinafter, for convenience of description, Prose direct communication will be referred to as D2D communication, and signal transmission through Prose direct communication will be referred to as D2D signal transmission. Therefore, ProSe discovery, ProSe communication, etc. may be referred to as D2D discovery, D2D communication, etc.

Resource Allocation Scheme for D2D Service

As resource schemes required for D2D discovery, communication, etc., the following two schemes may be used. A non-UE specific resource allocation scheme is used in type 1 in case of discovery and mode 2 in case of communication. An eNB may announce resource pool configuration to UEs through SIB (SystemInformationBlockType18, SystemInformationBlockType19). The UE may transmit a D2D signal by randomly selecting a resource which will be used for signal transmission in a resource pool. By contrast, in type 2 in case of discovery and mode 1 in case of communication, information on a resource pool is not included in the SIB. Since a UE specific resource is allocated, a UE of RRC_connected state may request the eNB of a resource and transmit a D2D signal through the resource allocated from the eNB. If the UE is in an RRC-IDLE state, the UE needs to enter the RRC-connected state to request the resource. Therefore, the UE of the RRC_IDLE state should transmit a service request (SR) to enter the RRC-connected state.

In this case, regarding the service request, i) if D2D communication/discovery signal transmission through a higher layer of a NAS layer is configured and there are available data for the corresponding communication, and ii) (only) if SystemInformationBlockType18/SystemInformationBlockType19 is broadcasted by a cell on which a UE camps and a useful version of SystemInformationBlockType18/SystemInformationBlockType19 does not include information (commTxPoolNormalCommon/discTxPoolCommon) on a D2D resource pool, the higher layer of the NAS layer may initiate RRC connection. In addition, details of the service request are defined in the LTE standard document TS 36.331, and it is noted that a prior material of the LTE standard document TS 36.331 is used together with the embodiment of the present invention.

Change of D2D Resource Allocation Scheme

As described above, an operation of an UE to perform D2D communication is varied depending on whether a D2D UE is in RRC_IDLE state or RRC_connected state and whether SIB of a cell on which the UE currently camps includes information on a D2D resource pool. In this regard, the following Table 2 illustrates an operation required for the D2D UE to perform D2D communication. (The following Table 2 conceptually discloses only a portion related to RRC connection and resource allocation, and does not disclose all operations for transmitting a D2D signal.)

TABLE 2

| | SIB does not include information related to resource pool (mode 1/type 2) | SIB includes information related to resource pool (mode 1/type 2) |
|---|---|---|
| RRC_IDLE | SR -> RRC connected -> resource request -> | resource selection -> D2D signal transmission |

TABLE 2-continued

| | SIB does not include information related to resource pool (mode 1/type 2) | SIB includes information related to resource pool (mode 1/type 2) |
|---|---|---|
| RRC_connected | | resource allocation by eNB -> D2D signal transmission resource request -> resource allocation by eNB -> D2D signal transmission |

Referring to Table 2, if the UE of the RRC_IDLE state receives SIB transmitted from the eNB of mode 1/type 2, the UE may be switched to the RRC_connected state by transmitting the SR and then request a resource for D2D signal transmission and transmit the D2D signal by receiving the requested resource. If the UE of the RRC_connected state receives SIB transmitted from the eNB of mode 1/type 2, the UE may transmit a D2D signal by requesting/receiving a resource for D2D signal transmission. Subsequently, if the UE of the RRC_IDLE state or the RRC_connected state receives SIB transmitted from the eNB of mode 2/type 1, the UE may select a resource and then transmit a D2D on the basis of information on a D2D resource pool.

Figure 8:
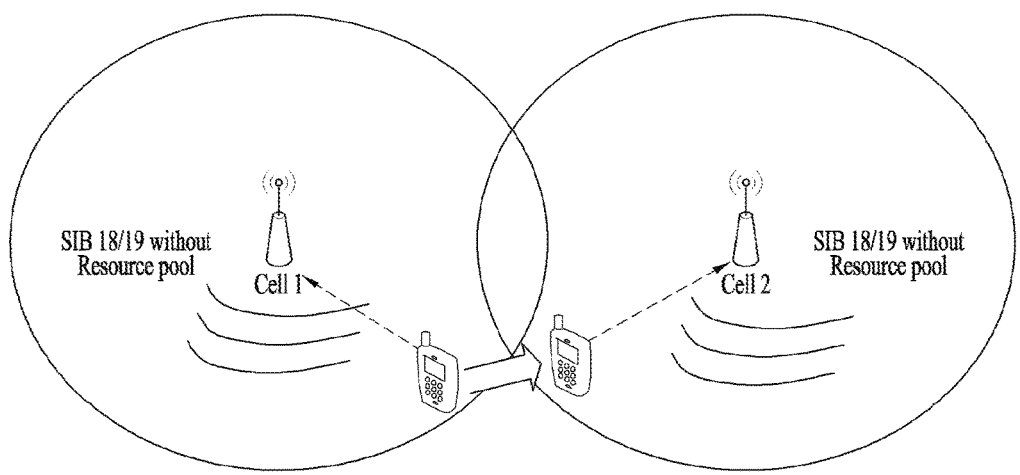
Figure 9:
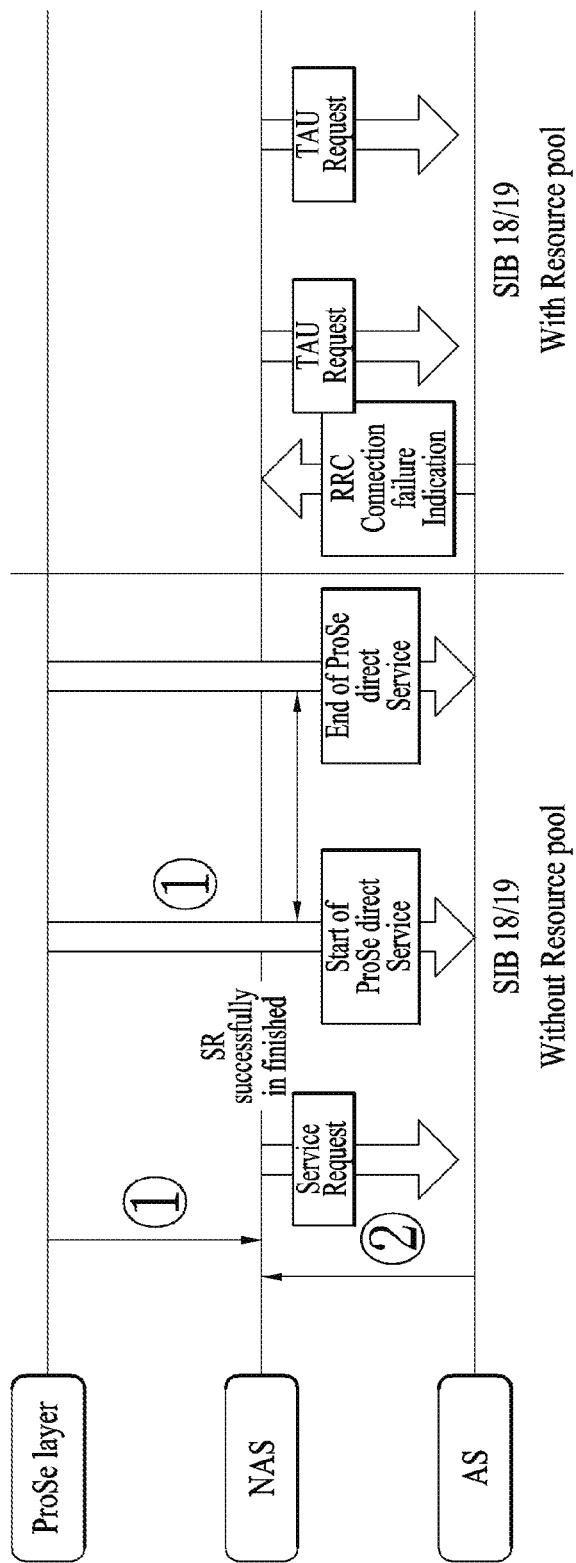

Based on the aforementioned description, problems caused by change of the resource allocation scheme shown in FIGS. 8 to 9 will be described. As illustrated in FIG. 8, change of the resource allocation scheme may occur as the D2D UE moves from a cell (cell 1) for transmitting SIB, which does not include information on a D2D resource pool, to a cell (cell 2) for transmitting SIB, which includes information on a D2D resource pool. However, the embodiment of the present invention is not limited to the case of FIG. 8, and change of the resource allocation scheme includes various reasons such as a case that the resource allocation scheme is changed as the cell on which the UE camps reconfigures (for example, change of configuration from mode 1 to mode 2) the resource allocation scheme. Like the example of FIG. 8, change of the resource allocation scheme from the case that the SIB does not include information on a D2D resource pool (SIB 18/19 without resource pool) to the case that the SIB includes information on a D2D resource pool (SIB with resource pool) is shown in FIG. 9. In FIG. 9, it is assumed that an initial state of the UE is the RRC_IDLE state.

Referring to FIG. 9, since the SIB received by the UE does not include information on a D2D resource pool (that is, mode 1/type 2), the UE is switched to the RRC_connected state by transmitting the SR. The UE may transmit a D2D signal by requesting a resource.

Transmission Operation of TAU Request

When there is no pending data or signaling in the UE, the UE performs a TAU request if a radio link failure occurs. If the UE should perform the TAU request together with an SR request, the UE transmits the message to a network by setting an active flag to 1 in an EPS update type IE of the TAU request message. In this case, the UE performs the TAU request successfully and then performs the SR request. Even in case of D2D, if the UE should perform SR request for resource request to an eNB together with the TAU request to transmit a D2D signal, the UE transmits the message to the network by setting an active flag to 1 in the EPS update type IE of the TAU request message.

Retransmission Operation of TAU Request

After TAU request of the UE, the UE is operated as follows in accordance with a TAU attempt counter regarding a case that RRC connection failure (Radio Link failure) occurs, a case that NAS signaling is released without reception of an extended wait time from an RRC layer before TAU grant or TAU rejection, a case that a T3430 timer is timed out, a case that a cause other than causes specified in subclause 5.5.3.2.5 of TS 24.301 is received together with the specified causes during reception TAU REJECT or EMM causes #22 and #25 are received together but regarded as an abnormal case, a case that an extended wait time is received from the RRC layer, and a case that a T3346 timer is running.

If the TAU attempt counter is 5 or less, the UE starts a T3411 timer, and starts the TAU procedure again after the T3411 timer expires. If the TAU attempt counter is 5 or more, the UE starts a T3402 timer, and performs PLMN selection if the T3402 timer expires.

Transmission/Retransmission of D2D and TAU

TAU transmission/retransmission may occur while D2D service is ongoing. At this time, a retransmission time period of one time between TAU request messages corresponds to several seconds, and is rapidly increased if repeated retransmission is considered. For this time period, the UE cannot use a communication service (or D2D discovery). This may aggravate user experience, and may delay a handling time to an emergency status to cause a risk status if the corresponding service corresponds to public safety. Also, as shown, if the SIB is changed to include information on a D2D resource pool after RRC failure, repetition of the TAU request may be repetition of an unnecessary procedure and unnecessary resource use. This is because that the UE may select a resource at the RRC_IDLE state without establishing RRC connection and perform D2D signal transmission if the SIB includes the information on a D2D resource pool as described above.

Therefore, a method for reducing unnecessary signaling or D2D service delay by efficiently handling NAS signaling in accordance with a change of a resource allocation scheme will be suggested hereinafter.

Embodiment 1

Under the aforementioned status, if the SIB includes information on a resource pool, the UE may not perform RRC recovery related operation even though RRC connection failure occurs. In more detail, in the status of FIG. 9, the UE of the RRC_IDLE state may be switched to the RRC connection state through transmission of a service request, may be allocated with a resource for D2D communication, and may transmit a D2D signal through the allocated resource. Afterwards, the UE may receive the SIB after transmitting the D2D signal. In this case, the SIB may be caused by a change of the SIB of the current eNB or a change of the eNB selected by cell selection due to movement of the UE. If the SIB includes information on a resource pool, the UE may not perform RRC recovery related operation even though RRC connection failure occurs.

In this case, the RRC recovery related operation may include transmission of the TAU request to MME. If RRC connection failure occurs when there is no pending user uplink data or signaling, the TAU request is performed for NAS signaling recovery. If the TAU request is failed, retransmission may be attempted. At this time, if a TAU attempt counter is less than 5, the UE starts a T3411 timer in the middle of the TAU procedure or after the TAU procedure when the following result is obtained. After the T3411 timer expires, the UE retransmits the TAU request. If the TAU attempt counter is 5 or more, the UE starts a T3420 timer and then performs PLMN selection if the T3420 timer expires. Details of the TAU request and retransmission operation have been described as above. In this case, the UE should perform a transmission/retransmission procedure of the TAU request in accordance with the legacy LTE standard document 24.301 but does not perform the transmission/retransmission procedure if the SIB, which includes a resource pool, is changed, whereby an unnecessary procedure may not be performed, and thus resource waste and signaling load due to the unnecessary procedure may be reduced.

Subsequently, since the SIB includes information on a resource pool, the UE may recognize change of mode/type and also transmit the D2D signal by selecting a resource from the resource pool. That is, if the UE has D2D data to be transmitted, the UE may transmit the D2D data by using a part of the resource pool.

When the UE is in the connected state for a guard time after a D2D service is performed, RRC connection failure occurs, whereby the TAU request should be performed. In this case, the UE does not perform a NAS signaling recovery procedure by identifying the SIB information, whereby unnecessary TAU request is not performed.

The operation suggested in the present invention may be configured as follows. NAS and RRC layers recognize that the D2D service has been ended.

The RRC layer also identifies that the resource allocation scheme is changed to mode 2 (or type 1), through the SIB.

The UE determines that NAS signaling recovery is not required in RRC, and thus notifies a NAS layer of stop indication for stopping the NAS recovery procedure or the changed resource allocation scheme (mode 2 or type 1).

If the NAS layer starts the recovery procedure, the NAS layer stops the recovery procedure. If the NAS layer does not start the recovery procedure, the NAS does not perform the recovery procedure, and the RRC layer is switched to mode 2 (or type 1) to perform resource allocation and the UE triggers an operation for a corresponding D2D service procedure through PC5.

Embodiment 2

In the same manner as the embodiment 1, if the SIB includes information on a resource pool even in case of the following, the UE may not perform RRC recovery related operation even though RRC connection failure occurs.

Figure 10:
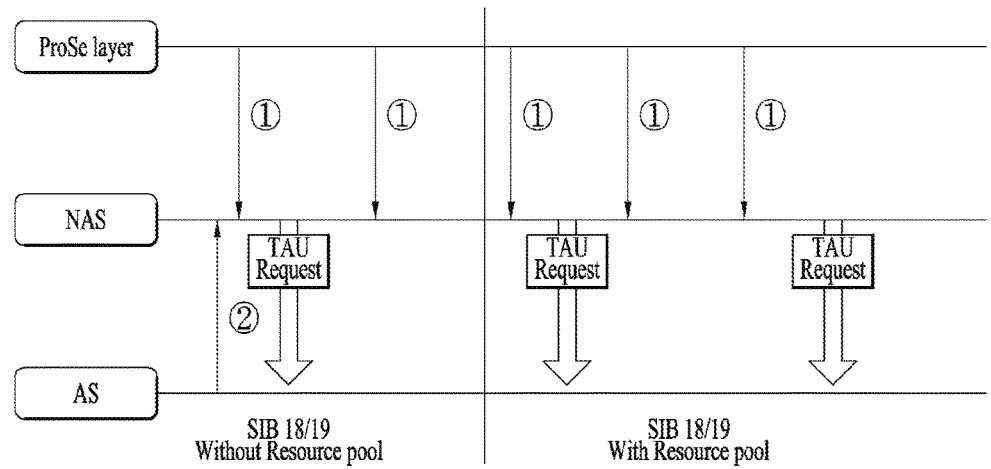

In more detail, in the status of FIG. 10, if the UE should request the eNB of SR for resource request to transmit D2D signal together with the TAU request as described in TAU request operation, the UE transmits the TAU request message to the network by setting an active flag to 1 in an EPS update type IE of the TAU request message. At this time, if the aforementioned TAU request retransmission operation is performed as the corresponding TAU request is not performed successfully, the UE is operated as follow. If a TAU attempt counter is less than 5, the UE starts a T3411 timer and retransmits the TAU request after the T3411 timer expires. If the TAU attempt counter is 5 or more, the UE starts a T3420 timer and then performs PLMN selection if the T3420 timer expires. Details of the TAU request and retransmission operation have been described as above.

In this case, the UE should perform a transmission/retransmission procedure of the TAU request in accordance with the legacy LTE standard document 24.301 but does not perform the transmission/retransmission procedure if the SIB, which includes a resource pool, is changed, whereby an unnecessary procedure may not be performed, and thus resource waste and signaling load due to the unnecessary procedure may be reduced.

Subsequently, since the SIB includes information on a resource pool, the UE may recognize change of mode/type and also transmit the D2D signal by selecting a resource from the resource pool. That is, if the UE has D2D data to be transmitted, the UE may transmit the D2D data by using a part of the resource pool.

If the active flag is set to 1 and the TAU request for D2D service resource request is not performed successfully and then TAU request transmission occurs, the UE does not perform a NAS signaling recovery procedure by identifying the SIB information, whereby unnecessary TAU request is not performed.

The operation suggested in the present invention may be configured as follows.

NAS and RRC layers recognize that the TAU request includes D2D service resource request.

The RRC layer also identifies that the resource allocation scheme is changed to mode 2 (or type 1), through the SIB.

The UE determines that NAS signaling recovery is not required in RRC, and thus notifies a NAS layer of stop indication for stopping the NAS recovery procedure or the changed resource allocation scheme (mode 2 or type 1).

If the NAS layer starts the recovery procedure, the NAS layer stops the recovery procedure. If the NAS layer does not start the recovery procedure, the NAS does not perform the recovery procedure, and the RRC layer is switched to mode 2 (or type 1) to perform resource allocation and the UE triggers an operation for a corresponding D2D service procedure through PC5.

Embodiment 3

The embodiment 3 relates to an opposite case that mode 2 (or type 1) is changed to mode 1 (or type 2). In this case, two statuses may occur as follows.

First of all, when the current eNB requests the UE of mode 2 through the SIB, the UE may transmit a data message corresponding to D2D communication by directly performing resource allocation even in RRC-IDLE mode. In this case, if the data message is rejected or a response to the data message is not received, the RRC recovery procedure for retransmission is operated. At this time, if the SIB is changed to mode 1, a method how to handle the existing recovery procedure has not been defined.

Secondly, the same problem occurs even in case of the D2D discovery procedure. If the SIB corresponds to type 1, the UE which is RRC-IDLE mode transmits a PC5_discovery message through direct resource allocation. In this case, if the PC5_discovery message is rejected or a response to the PC5_discovery message is not received, a recovery procedure for retransmission is operated (operation related to an entity for performing recovery is not defined). At this time, if the SIB is changed to type 2, a method how to handle the existing recovery procedure has not been defined.

In case of the first case, that is, when the current eNB performs D2D communication service in mode 2 through the SIB, if the data message is rejected or the response to the data message is not received, the RRC recovery procedure for retransmission is operated. At this time, if the SIB is changed to mode 1, the existing RRC recovery procedure may be stopped. Determination as to stop of the RRC recovery procedure is performed by the RRC layer. For example, if it is determined that a cause of the RRC recovery procedure is resource allocation, the RRC recovery procedure may be stopped. The RRC layer may be operated in mode 1 to receive resource allocation from the eNB, thereby performing the D2D communication service.

In case of the second case, that is, when the UE desires the D2D discovery service and the SIB is type 1, the UE of the RRC-IDLE (EMM-IDLE mode) transmits the PC5_discovery message by directly performing resource allocation. In this case, if the PC5_discovery message is rejected or the response to the PC5_discovery message is not received, the recovery procedure for retransmission is operated. At this time, if the SIB is changed to type 2, the existing recovery procedure for the PC5_discovery message may be stopped. The RRC layer may be operated in type 2 to receive resource allocation from the eNB, thereby performing the D2D discovery service. Determination as to the recovery procedure for the PC5_discovery message may be performed by a layer that is in charge of the recovery procedure. When the recovery procedure for the PC5_discovery message is in charge of a layer (ProSe protocol layer or NAS layer) other than the RRC layer, if the RRC layer recognizes the change to type 2, the RRC layer may trigger to stop the recovery procedure by transmitting stop indication or the changed type information to the layer which is in charge of the recovery procedure, and may perform the D2D discovery service by receiving resource allocation form the eNB. (If the ProSe protocol layer is in charge of the recovery procedure, the RRC layer may directly transmit the stop indication or the changed type information to the ProSe protocol layer or may transmit the stop indication or the changed type information to the ProSe protocol layer through the NAS layer.) The layer, which is in charge of the recovery procedure and has received the stop indication from the RRC layer, stops the recovery procedure. If the RRC layer is in charge of the recovery procedure for the PC_5 discovery message, the RRC layer stops the recovery procedure and performs step II.

Embodiment 4

The embodiment 4 relates to a case that the changed SIB information supports both mode 1 and mode 2 (or type 1 and type 2). The following three cases may be examples of the case of the embodiment 4. First of all, when the UE of the RRC-IDLE mode desires to perform a D2D service in mode 1 (or type 2), the UE performs a service request procedure. However, as the service request message is rejected or a response to the service request message is not received or RLF (radio link failure) occurs, the UE performs the NAS recovery procedure. At this time, the SIB information may be changed to support both mode 1 and mode 2 (or type 1 and type 2).

Secondly, when the UE desires to perform a D2D communication service in mode 2, the UE transmits data traffic to a PC5 interface by performing direct resource allocation from a resource pool. At this time, in a state that retransmission occurs due to a problem of channel quality or as there is no response (i.e., ack), the SIB information may be changed to support both mode 1 and mode 2.

Thirdly, when the UE desires to perform the D2D communication service in type 1, the UE transmits the PC5_discovery message to the PC5 interface by performing direct resource allocation from the resource pool. At this time, in a state that retransmission occurs due to a problem of channel quality or as there is no response (i.e., ack), the SIB information may be changed to support both type 1 and type 2.

In the above three cases, the number of message retransmission times may be counted through an attempt counter during the ongoing procedure (service request, data traffic transmission, or PC5_discovery message transmission). To this end, the attempt counter is required for each ongoing procedure (service request, data traffic transmission, or PC5_discovery message transmission). A method for stopping retransmission is the same as above scenarios A) and B), and a value of N may be different per scenario.

When the corresponding number of retransmission times is N or more and the SIB information indicates that the network supports both mode 1 and mode 2 (or type 1 and type 2), the UE in the corresponding resource allocation scheme may be switched to another resource allocation scheme by stopping the corresponding retransmission and then perform the D2D service.

Figure 11:
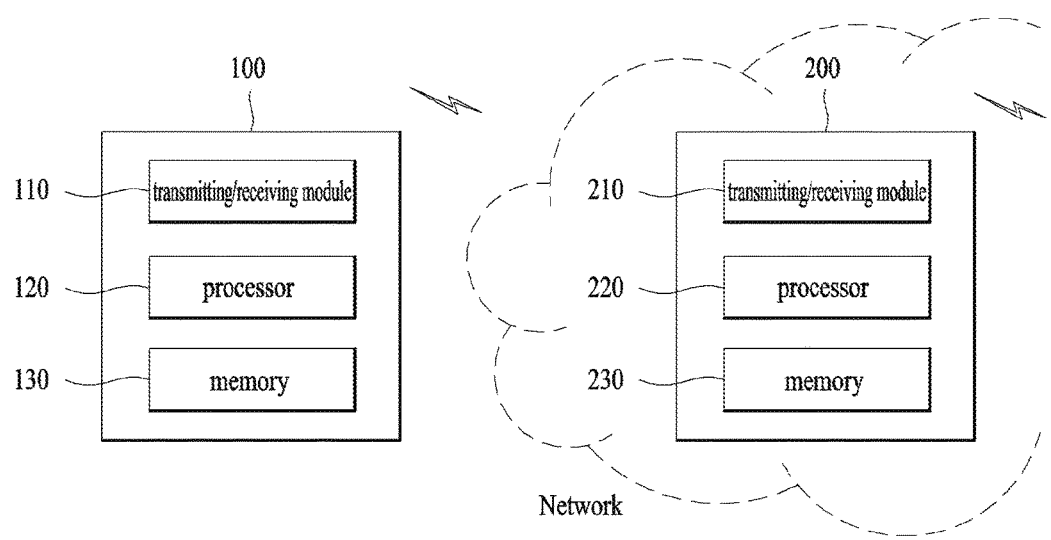
FIG. 11 is a diagram illustrating a UE and a network node device according to one embodiment of the present invention.

FIG. 11 is a diagram illustrating configurations of a UE and a network node device according to the embodiment of the present invention.

Referring to FIG. 11, a UE 100 according to the present invention may include a transceiving module 110, a processor 120 and a memory 130. The transceiving module 110 may be configured to transmit various signals, data and information to an external device and receive various signals, data and information from the external device. The user equipment 100 may be connected with the external device through the wire and/or wireless. The processor 120 may control the overall operation of the user equipment 100, and may be configured to perform a function of operation-processing information to be transmitted to and received from the external device. Also, the processor 120 may be configured to perform a UE operation suggested in the present invention. The memory 130 may store the operation-processed information for a predetermined time, and may be replaced with a buffer (not shown).

Referring to FIG. 11, the network node device 200 according to the present invention may include a transceiving module 210, a processor 220, and a memory 230. The transceiving module 210 may be configured to transmit various signals, data and information to an external device and to receive various signals, data and information from the external device. The network node device 200 may be connected with the external device through the wire and/or wireless. The processor 220 may control the overall operation of the network node device 200, and may be configured to perform a function of operation-processing information to be transmitted to and received from the external device. Also, the processor 220 may be configured to perform a network node operation suggested in the present invention. The memory 230 may store the operation-processed information for a predetermined time, and may be replaced with a buffer (not shown).

Also, the details of the aforementioned UE 100 and the aforementioned network node device 200 may be configured in such a manner that the aforementioned various embodiments of the present invention may independently be applied to the aforementioned UE 100 and the aforementioned network node device 200, or two or more embodiments may simultaneously be applied to the aforementioned UE 100 and the aforementioned network node device 200, and repeated description will be omitted for clarification.

The aforementioned embodiments according to the present invention may be implemented by various means, for example, hardware, firmware, software, or their combination.

If the embodiments according to the present invention are implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the method according to the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

Although the aforementioned various embodiments of the present invention have been described based on the 3GPP system, the aforementioned embodiments may be applied to various mobile communication systems.

What is claimed is:

1. A method for performing device-to-device (D2D) communication in a wireless communication system, the method performed by a User Equipment (UE) and comprising:
   switching to a radio resource control (RRC) connection state via transmission of a service request;
   receiving allocation of a resource for the D2D communication;
   transmitting a D2D signal using the allocated resource;
   receiving a system information block (SIB) after transmitting the D2D signal; and
   not performing an RRC recovery-related operation if the SIB includes information related to a resource pool even if RRC connection failure occurs within a predetermined time before tracking area update (TAU) grant or TAU rejection is received.

2. The method according to claim 1, wherein the RRC connection failure occurs when there are no pending user uplink data.

3. The method according to claim 1, wherein the SIB is either SystemInformationBlockType18 or SystemInformationBlockType19.

4. The method according to claim 1, wherein the RRC recovery related operation comprises transmitting a TAU request to a mobile management entity.

5. The method according to claim 1, further comprising transmitting D2D data using a portion of the resource pool if the UE has D2D data for transmission.

6. The method according to claim 1, wherein information indicating the RRC connection failure is transmitted from an RRC layer to a Non-Access-Stratum layer.

7. The method according to claim 1, wherein a transmission mode is 1 when the service request is transmitted and a transmission mode indicated by the SIB is mode 2.

8. The method according to claim 1, wherein a discovery type is type 2 when the service request is transmitted and a discovery type indicated by the SIB is type 1.

9. The method according to claim 1, wherein the D2D signal is either a discovery signal or a communication signal.

10. A User Equipment (UE) performing device-to-device (D2D) communication in a wireless communication system, the UE comprising:
    a transceiver configured to transmit and receive signals; and
    a processor configured to:
    switch to a radio resource control (RRC) connection state via the transmission of a service request;
    receive an allocated resource for the D2D communication;
    transmit a D2D signal using the allocated resource;
    receive a system information block (SIB) after transmitting the D2D signal; and
    not perform an RRC recovery-related operation if the SIB includes information related to a resource pool even if RRC connection failure occurs within a predetermined time before tracking area update (TAU) grant or TAU rejection is received.

11. The UE according to claim 10, wherein the RRC connection failure occurs when there are no pending user uplink data.

12. The UE according to claim 10, wherein the SIB is either SystemInformationBlockType18 or SystemInformationBlockType19.

13. The UE according to claim 10, wherein the RRC recovery related operation comprises transmitting a TAU request to a mobility management entity.

14. The UE according to claim 10, further comprising transmitting D2D data using a portion of the resource pool if the UE has D2D data for transmission.

15. The UE according to claim 10, wherein information indicating the RRC connection failure is transmitted from an RRC layer to a Non-Access-Stratum layer.

16. The UE according to claim 10, wherein a transmission mode is 1 when the service request is transmitted and a transmission mode indicated by the SIB is mode 2.

17. The UE according to claim 10, wherein a discovery type is type 2 when the service request is transmitted and a discovery type indicated by the SIB is type 1.

18. The UE according to claim 10, wherein the D2D signal is either a discovery signal or a communication signal.

* * * * *